July 9, 1968  J. F. KING ETAL  3,391,682
CHARCOAL BROILER

Filed Nov. 2, 1966  2 Sheets-Sheet 1

INVENTORS
JAY FRED KING
DAVID KROEDEL WALZ

ATTORNEYS

July 9, 1968  J. F. KING ET AL  3,391,682
CHARCOAL BROILER

Filed Nov. 2, 1966  2 Sheets-Sheet 2

INVENTORS
JAY FRED KING
DAVID KROEDEL WALZ
ATTORNEYS

United States Patent Office 3,391,682
Patented July 9, 1968

3,391,682
CHARCOAL BROILER
Jay Fred King, Decatur, and David Kroedel Walz, Stone Mountain, Ga., assignors to The Atlanta Stove Works, Inc., Atlanta, Ga., a corporation of Georgia
Filed Nov. 2, 1966, Ser. No. 591,544
9 Claims. (Cl. 126—25)

ABSTRACT OF THE DISCLOSURE

A charcoal broiler comprising a stationary grill horizontally disposed in a housing, a movable grate normally horizontally disposed below the grill and pivotal with the housing door having a bottom mounted horizontally extending hinge through an arc in an outward and downward direction from the housing, while maintaining its horizontal disposition. An ash pan is movable with the grate, the grate is adjustable in height, and its weight tends to maintain the housing door either opened or closed.

---

While charcoal grills have become popular for outdoor cooking, most grills lack versatility in use in that they are too small for a large cookout where large quantities of food must be prepared, or if large enough for this function, they are constructed in such a manner that they fail to take full advantage of the fuel used therein since the grate or surface used to hold the fuel is usually disposed at a distance proper for using a large quantity of fuel in large cookouts. Furthermore, the cleaning of the grate or surface on which the charcoal rests is usually a dirty and difficult job since no provision is made for independently removing this portion of the grill, thus necessitating cleaning the whole grill.

Accordingly, this invention comprises a charcoal grill or broiler which includes an ash pan and grate assembly which can be independently removed from the broiler and which can be positioned at various elevations with respect to the grill of the broiler. Also, the broiler is portable in that it is mounted on wheels, a removable cutting surface is mounted on the broiler which can be removed from the broiler and independently cleaned, wind guards are provided on three sides of the grill area that extend upwardly of the grill area to prevent wind from interfering with the cooking process, a cover is pivotally connected to the broiler which is movable to a position where it will not interfere with the operator when he is cooking on an open grill or otherwise adjusting the broiler and movable to a closed position where the operator can broil or smoke the food, and air vents are provided to insure an even flow of air through the broiler.

Accordingly, it is an object of this invention to provide a charcoal broiler wherein an ash pan and grate assembly is constructed and arranged to be positioned at various elevations from the grill surface.

Another object of this invention is to provide a simplified method for adjusting the height of the charcoal with respect to the grill in a charcoal broiler.

Another object of this invention is to provide a charcoal broiler wherein the charcoal can be removed from beneath the grill during the cooking operation, adjusted, and then replaced beneath the grill.

Another object of this invention is to provide a charcoal broiler that includes convenient storage space and working space adjacent the broiler, adjustable air vents to control the air flow through the broiler housing, means for preventing the flow of air over the grill of the broiler, and means for conveniently removing ashes from the grate of the broiler without disturbing the food or charcoal.

Another object of this invention is to provide a charcoal broiler that is neat in appearance, convenient in use, economical to manufacture, expedient in its assembly, adjustable to meet the various requirements of cooking large or small quantities of food, expedient to clean and well designed to meet the requirements of expedient and economical manufacture.

Other objects, features and advantages of the present invention will become apparent upon reading the following specification, taken in conjunction with the accompanying drawing, in which.

Figures 1, 2:
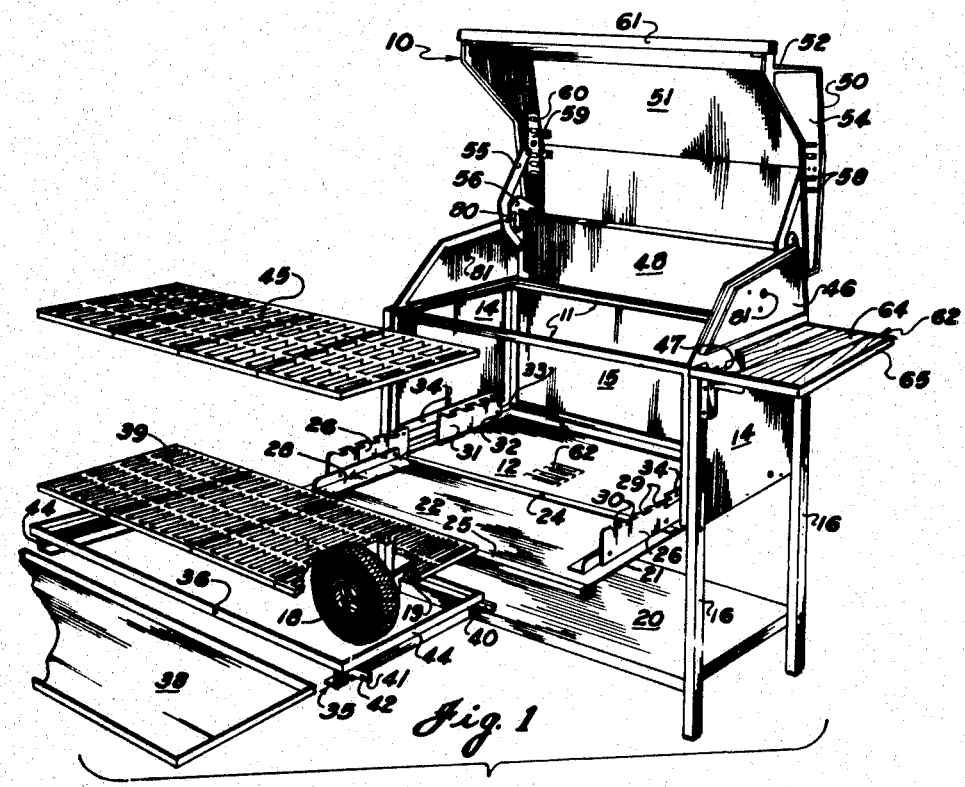
FIG. 1 is a perspective view of the broiler with the cover in its open position, the door in its open position, the grill removed therefrom, and the ash pan and grate assembly removed therefrom; the ash pan and grate assembly and grill being shown in exploded position.
FIG. 2 is a detailed showing of the bottom of the grill, showing the bottom air vent.

Referring now more particularly to the drawing, in which like numerals indicate like parts throughout the several views, FIG. 1 shows the charcoal broiler 10 which includes an internal frame 11. The frame 11 is constructed of angle iron and is generally rectangular in shape. The angle iron of the frame is welded together so as to form a rigid structure and the angle iron forming the upper surface of the frame is arranged to provide a channel to receive the grill pieces of the broiler. A bottom panel 12 is connected to the bottom portion of the frame 11, end panels 14 are connected to the end of the frame, and back panel 15 is connected to the back of the frame, to form the broiler housing. Legs 16 are connected to the end panels 14 vertically extending portions of the internal frame 11 to support the broiler from the ground. The legs at the left side of the broiler (as shown in FIG. 1) are selectively rigged with wheels 18 attached to axle 19 which extends through the bottom ends of the legs. A rectangular shelf or platform 20 is connected at its corners to legs 16 by means of screws or other conventional connecting means. The shelf 20 is disposed below the broiler housing a distance sufficient to provide a convenient storage space and the shelf provides support and rigidity to the legs.

Figure 5:
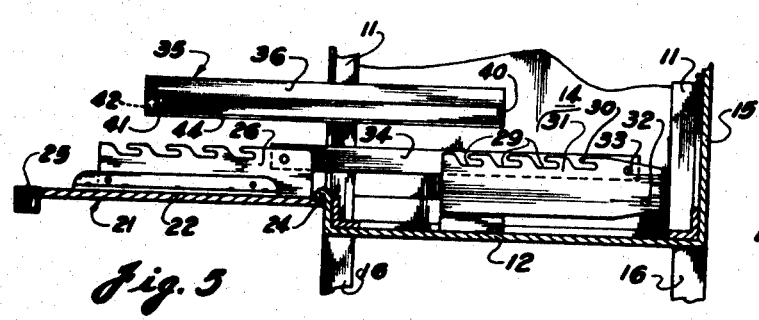
FIG. 5 is a detailed showing of the parallel linkage of the door assembly.

A door assembly 21 is connected to the front of the internal frame 11 and includes a front panel 22, hinge 24, door handle 25, and grate support arms 26. The front panel 22 is sized and shaped to completely close the front opening of the internal frame 11, and hinge 24 extends substantially the entire width of the front panel 22 to provide proper pivotal support along the entire width of the front panel. The door handle 25 extends across the upper edge of the front panel 22 to provide a convenient means for opening or pivoting the front panel 22. Grate support arms 26 are attached to the front panel 22 by means of angle irons 28, which provide extra rigidity to the front panel 22. Grate support arms 26 each include a series of recesses 29 that are provided with lips 30 shaped to support the front surface of the ash pan and grate assembly. Rear grate support arms 31 of a size and shape similar to front grate support arms 26 are positioned parallel to front grate support arms 26 in the housing, near back panel 15. Rear grate support arms 31 are pivotally connected to the end panels 14 by means of pivot pins 32. Pivot pins 32 are located at one corner of the rear grate support arm, and connecting arms 34 are pivotally connected to each rear grate support arm by a bolt 33 disposed at a point displaced from pivot pins 32 and to the front grate support arms at a distance displaced from the front panel 22. With this arrangement, the bottom panel 12, grate support arms 26 and 31 and connecting arm 30 on each side of the housing form parallel linkages so that rear grate support arms 31 will always be disposed parallel to front grate support arms 26 when the door assembly 21 is pivoted about its hinge 24 (see FIG. 5). Fuhthermore, connecting arms 34 are connected to rear grate support arms 31 in such a manner that the recesses 29 of the rear grate support arms 31 will be disposed below the upper edge of the connecting arm 34 when the door assembly 21 is in its fully opened position. When the door assembly 21 is pivoted toward its closed position, the rear grate support arms 31 will pivot about pivot pin 32 so that recesses 29 will pivot vertically above connecting arms 34. With this construction, the support arms from the ash pan and grate assembly resting on the connecting arms 34 when the door assembly 21 is in its open position will be lifted away from the connecting arms 34 by the rear grate support arms 31 as the door assembly 21 is moved toward its closed position, and the support rods of the ash pan and grate assembly will tend to come to rest in the recesses 29 of the rear grate support arms 31.

The ash pan and grate assembly 35 includes a rectangular frame 36 constructed of angle iron, ash pan 38, and grate elements 39. Frame 36 is constructed to present a support surface for the grate elements 39, and support rods 40 and 41 are connected to the bottom surfaces of the frame 36, and extend entirely across the width of the frame and slightly beyond the frame on each side thereof a distance sufficient to be received in the grate support arms 26 and 31. Front support rod 41 is notched at 42 at each of its ends so that it will not slide laterally off grate support arms 26 of the door assembly 21.

Frame 36 includes ash pan support slides 44 connected therebelow and on opposite sides thereof. Ash pan 38 is slidably received in the ash support slides 44, below the frame 36. Since grate elements 39 are positioned on the frame 36, ash pans 38 will be maintained a short distance below the grate elements 39 so as to catch the ashes falling from charcoal resting on the grate elements.

The ash pan and grate assembly 35 is received in the housing of the broiler 10 upon opening the door assembly 21 so that the rear grate support arms 31 are positioned below the upper edge of connecting arms 34 (see FIG. 5), and the support rod 40 is positioned on the upper edge of the connecting arms 34. Front support rod 41 is allowed to rest on the front grate support arms 26, the slots 42 of the front support rod resting on the front grate support arms 26. When the door assembly 21 is closed, the grate support arms 26 and 31 will pivot to an upright position and support rods 40 and 41 will be received in recesses 29 of the grate support arms 26 and 31. If the front support rod 41 is not disposed in a recess 29 when the door assembly 21 is pivoted toward its closed position, the ash pan and grate assembly 35 will slide over the surface of the front grate support arms 26 until support rod 41 is received in one of the recesses 29 of each front grate support arm 26. As the door assembly 21 is closed, the rear grate support arms 31 pivot about their pivot pins 32 and pivot above the upper edge of the connecting arms 34. Of course, the rear support rod 40 will then rest on the upper edge of the rear grate support arms 31. The front grate support rod 41 is spaced from the rear support rod 40 a distance corresponding to the distance between the recesses 29 of the adjacent front grate support arms 26 and the rear grate support arms 31 so that when the front support rod 41 is received in one of the recesses 29 of the front grate support arms 26, the rear support rod 40 will be received in a corresponding recess 29 of the rear grate support arms 31. In this manner, the ash pan and grate assembly 35 is constantly maintained in a horizontal position, regardless of which of the recesses 29 of the front and rear grate support arms in which it is received. Of course, if the front support rod 41 is placed in the recesses 29 of the front grate support arms 26 that are closely adjacent the door handle 25, when the door assembly 21 is pivoted to its closed position, the ash pan and grate assembly 35 will be positioned higher in the housing of the broiler 10 than it would be if the front support rod 41 were positioned in one of the recesses 29 of the front grate support arms 26 that is more closely adjacent the bottom panel 12 of the housing. Thus, when it is desired to vary the elevation of the ash pan and grate assembly 35 within the housing of the broiler 10, it is merely necessary to pivot the door assembly 21 to its open position, lift the front edge of the ash pan and grate assembly 35 from its recesses 29 of the front grate support arms 26 and place the front support rod 41 in others of the recesses 29. Since the rear grate support arms 31 pivot below the edge of the connecting arms 34, the rear support rod 40 is lifted from its recesses 29, and the rear support rod 40 can be slid along the upper edge of the connecting arms 34 as the front support rod 41 is repositioned along the front grate support arms 26. Of course, when the front support rod 41 is repositioned into another of the recesses 29, closing the door assembly 21 will cause support rod 40 to be received in corresponding recesses 29 of the rear grate support arms 31.

Since the center of gravity of each rear grate support arm 31 and front grate support arm 26 is disposed rearwardly of its pivot pin 32 or hinge 24 when the door assembly 21 is in its closed position (see dotted lines of FIG. 5) the weight of the front and rear grate support arms will tend to hold the door assembly in its closed position. Of course, since the center of gravity of the front and rear grate support arms are moved forwardly of their pivot points when the door assembly is moved toward its open position, the weight of the grate support arms tends to hold the door assembly in its open position. When the ash pan and grate assembly is positioned on the grate support arms, its weight acts in a similar manner because of the location of recesses 29 in the grate support arms.

Grill elements 45 are received on the upper surface of the internal frame 11. Grill elements 45 and grate elements 39 are arranged to span the width of the internal frame 11 and ash pan and grate assembly frame 36, respectively, so that one of the grill or grate elements can be removed from the housing of the broiler 10 without disturbing the position of the remaining grill elements or grate elements.

Side wind guards 46 are attached to the side panels 14 on each of the housing of the broiler 10 by means of downwardly extending tabs 47, and extend above the grill 45 on the ends of the housing, while rear wind guard 48 extends upwardly from the back panel 15 of the housing in a similar manner. The side wind guards 46 are connected to the rear wind guard 48 along their common edges to prevent wind turbulence from three sides of the housing and to prevent food from falling from the surface of the grill 45 or grease from splattering from the grill. Of course, attachment of the side wind guards 46 to the rear wind guard 48 insures that these portions of the broiler are rigidly affixed to the housing.

A cover or top 50 is pivotally connected to the side wind guards 46 and arranged to pivot to cover the grill 45, or to pivot toward the real panel 15 of the housing, away from the position that the cook would normally maintain in using the broiler. Cover 50 includes an upper panel 51, front panel 52, and end panels 54. Upper panel 51 is slightly peaked at its center and end panels 54 are shaped to complement the shape of side wind guards 46. Cover 50 is pivoted from the side wind guards 46 by means of links 55 and 56 disposed at each end of the housing. Links 56 are generally U-shaped in configuration; one end of the U being connected to an upper portion of an end wind guard and the other end of the U being connected to the end panel 54 of the cover, near the rear of the cover. Link 55 is generally crescent shaped; one of its ends being connected to the side wind guard 46 below the connection of link 56, and the other of its ends being connected to the end panel 54 of the cover, forwardly of the connection of link 56. Thus, links 55 and 56 disposed at either end of the housing of the broiler 10 form a link hinge that allows the cover 50 to pivot with respect to the housing to an open position as shown in FIG. 1, or to a closed position.

The end panels 54 of the cover 50 are slotted at 58 and a slide element 59 is slidably attached to the inside surface of end panels 54 with slots 60 defined therein. The slide elements 59 can be slid back and forth on the inside of the end panels 54 to selectively block the slots 58 of the end panels or form an air passage through the end panels.

A handle 61 of a size and shape similar to door handle 25 is connected to and extends across the width of the cover 50. Handle 61 can be grasped by the cook to raise or lower the cover 50 of the broiler 10.

A chopping board assembly 62 is connected to the broiler 10 on the end thereof opposite from the ends on which the wheels 18 are present. The chopping board assembly 62 includes a chopping board 64 received in a frame 65 which is connected to the legs 16. The chopping board 64 can be removed from the frame 65 by merely lifting it out of the frame.

As is best shown in FIGS. 1 and 2, the bottom panel 12 of the broiler defines a series of slots 62 centrally thereof. A slide 64 is connected to the bottom surface of the bottom panel 12 in sliding relationship therewith and defines a series of slots 65 corresponding to slots 62. The slide 64 can be slid to cover slots 62 and block the flow of air into the broiler 10, or slid so that the slots 65 and 62 are coextensive with each other to create an air passage through the bottom panel 12.

Figure 3:
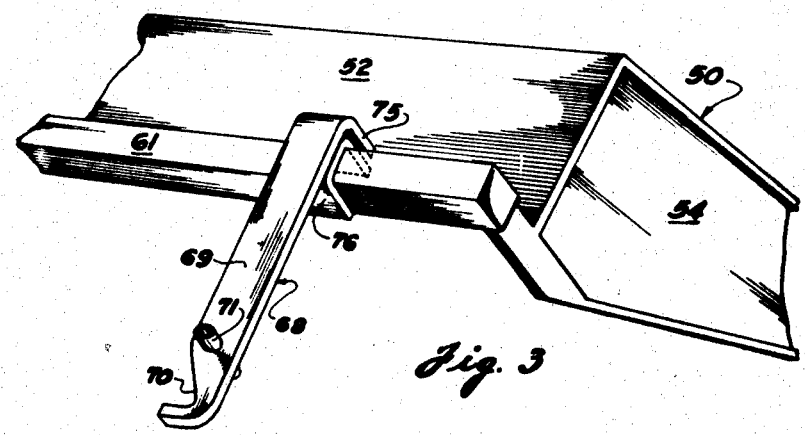
FIG. 3 is a perspective view of the grill lifter and the manner in which it can be attached to the door handle.
Figure 4:
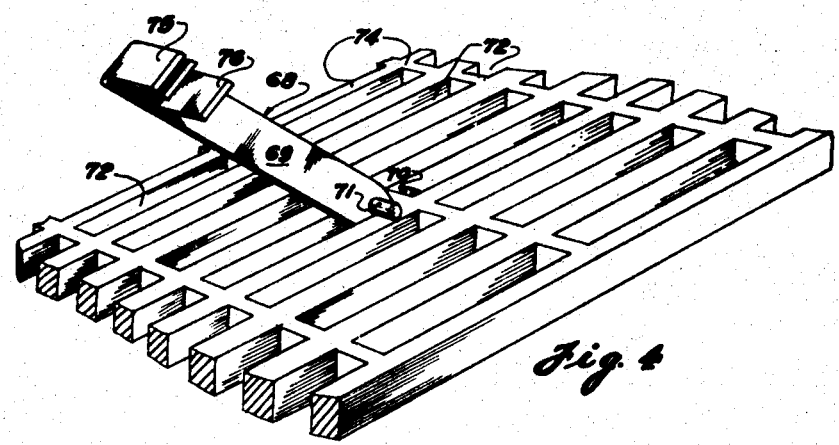
FIG. 4 is a perspective view of the grill lifter, showing the manner in which it is attached to the grill or grate.

As is best shown in FIGS. 3 and 4, a grill lifter 68 is provided for manipulating the grill elements and grate elements of the broiler. The grill lifter 68 comprises an elongated metal strap 69 which defines a crescent shaped recess 70 adjacent one of its ends. A pin 71 is received through an aperture in the strap 69 located adjacent the recess 70. The pin 71 protrudes from either side of the strap 69 a distance greater than the space between the bars 72 that extend across the width of the broiler, while the strap 69 is of a width such that it can be inserted between bars 72. With this construction, the strap 69 is inserted between the bars 72 until the recess 70 engages one of the laterally extending bars 74 of one of the grill elements 45 or grate elements 39, and the strap 69 pivoted until its pin 71 engages the upper surface of adjacent bars 72. The grill element or grate element then can be lifted from the broiler by lifting the strip 69.

Strap 69 is formed with an L-shaped bend at its end remote from its recess 70 to form a tab 75, and a C-shaped clip 76 is welded to the strap closely adjacent the tab 75. The distance between the legs of the clip 76 is approximately equal to the width of door handle 25 and cover handle 61 so that the cook can slip the clip 76 over either of these handles to manipulate the door assembly 21 or cover 50 of the broiler. Of course, the door handle 25 and cover handle 61 can be manipulated by hand when the grill is not hot; however, when the grill has been used for cooking and is hot, it is possible that door handle 25 or cover handle 61 will be too hot to be touched without the use of gloves or an instrument similar to grill lifter 68.

The space between the tab 75 of grill lifter 68 and the leg of the C-shaped clip 76 next adjacent thereto is approximately equal in width to the thickness of the frame 36 of the ash pan and grate assembly 35. Thus, the grill lifter can be connected to the frame 36 by sliding the grill lifter over the frame 36, between tab 75 and the next adjacent leg of the C-shaped clip 76, and the ash pan and grate assembly 35 can be manipulated and adjusted over the grate support arms 26 and 31. Since the length of tab 75 of the grill lifter 68 is shorter than the legs of the C-shaped clip 76, it is easy to position the grill lifter over the frame 36 of the ash pan and grate assembly 35 since the slot disposed between the tab 75 and the clip 76 is positively defined by the foreshortened length of tab 75.

OPERATION

When the broiler 10 is to be utilized for cooking, charcoal or other fuel is placed on grate elements 39 of the ash pan and grate assembly. Of course, the ash pan 38 is received in slides 44 so that it rests immediately below the grate elements 39 and is available to receive ashes falling from the charcoal. The ash pan and grate assembly 35 is placed in the housing of the broiler 10 by placing support rod 40 on the edge of connecting arms 34 and placing support rod 41 in one of the recesses 29 of the front grate support arms 26. After the charcoal has been lighted, the door assembly 21 is pivoted about its hinge 24 to its closed position. As the door assembly 21 is pivoted toward its closed position, rear grate support arms 31 will pivot about their pivot pins 32 and rear support rod 40 of the ash pan and grate assembly 35 will be received in one of the slots 29 of each rear grate support arm 31. Thus, the ash pan and grate assembly will be elevated toward the grill elements 45 as the door assembly 21 is pivoted toward its closed position; however, the ash pan and grate assembly 35 will be maintained in a horizontal disposition regardless of the position of the door assembly 21.

Grill elements 45 will be placed on the upper surface of internal frame 11 and vents 58 and 62 of cover 50 and bottom panel 12, respectively, open to insure proper flow of air through the housing of the broiler 10. The cover 50 can be pivoted to its closed position or can be left open.

When the fuel has been ignited to a point where it is sufficiently hot to perform the cooking operation, the food to be cooked is placed on the grill elements 45. If the charcoal is to be raised or lowered in the housing, the door assembly 21 is pivoted to its open position, grill lifter 68 attached to the frame 36 of the ash pan and grate assembly 35 by inserting tab 75 of the grill lifter over the edge of the frame 36, and support rod 41 lifted out of its recesses 29 and repositioned into others of its recesses 29. When the front support rod 41 is repositioned in this manner, rear support rod 40 will slide over the edge of connecting arms 34. When the door assembly 21 is then pivoted about its hinge 24 toward its closed position, rear grate support arms 31 will engage support rod 40; the support rod 40 falling into the recesses of rear grate support arms 31 that correspond to the recesses of the front grate support arms 26.

When the door assembly 21 is pivoted to its closed position and air vent 62 adjusted to insure proper entry of air into the housing of the broiler 10, the flow of air through the housing from the air vent 62 will emerge about the periphery of ash pan 38. Since the air vent 62 is disposed centrally of bottom panel 12, the usual air flow is distributed evenly about the periphery of ash pan 38. Of course, since air vents 68 in the cover 50 can be independently adjusted, it is possible that when the cover 50 is closed, all the air escaping from the housing of the broiler 10 can be directed through a single one of the vents 58 to facilitate heating the broiler to a higher temperature near one of its ends; however, it is anticipated that in most occurrences, the vents 58 at each end of the cover 50 will be equally adjusted to create an equal air flow through the ends of the cover.

Shelf 20 and chopping board 64 are provided for convenient surfaces for storage and working. If it is desired to move the broiler 10 to a different location, one end of the broiler can be lifted by lifting on the chopping board assembly frame 65 and rolling the grill on wheels 18. The broiler can be transported during the cooking operation or when hot since the frame 65 of the chopping board assembly 62 remains in a cool state.

When the cover 50 is pivoted to its open position as shown in FIG. 1, wing nut 80 can be screwed into link 55 so that it protrudes outwardly thereof and extends over the upper surface of side wind guard 46. Thus, when cover 50 is inadvertently pivoted toward its closed position, the wind nut 70 will come to rest on the upper edge of the side wind guard 46 to prevent the cover 50 from closing.

Side wind guards 46 each define an aperture 81 disposed centrally thereof. These apertures are arranged to accommodate a spit or elongated rod extending through the broiler at a position slightly above the level of the grill elements 45. With this arrangement, a spit can be rotated within the broiler 10 by manual or motorized means (not shown). Since the apertures 71 are disposed above the level of the grill elements 45, it is possible to operate a spit at the same time some of the grill elements are present in the housing of the broiler 10. Thus, the cook can operate a rotisserie and can cook food on the grill elements 45 at the same time.

If the broiler 10 is utilized for a prolonged period of time and the fuel present on the grate elements 39 dissipates, the door assembly 21 can be opened to expose the grate elements and more fuel can be added thereto. If the ash received in the ash pan 38 accumulates to an undesirable level, the ash pan 38 can be removed by sliding it out of its slides 44, emptied, and replaced below the grate elements 39. Because of the construction of the ash pan and grate assembly 35, the ash pan 38 is normally maintained beneath the grate elements 39 regardless of the position of the door assembly 21. Thus, the ash pan is in its proper position to receive ashes from the grate elements 39 when the ash pan and grate assembly 35 is positioned within the housing or when it is exposed, as when door assembly 21 is in its open position.

Wind guards 46 and 48 are positioned so that they protect the grill elements 45 from wind turbulence when the cover 50 is open. Side wind guards 46 are truncated at an angle near their front edges so that they do not interfere with the cooking procedure. Of course, end panels 54 of cover 50 complement the shape of side wind guards 46 so that an air seal is maintained between the cover 50 and the housing of the broiler 10 when the cover is in its closed position.

While the charcoal broiler 10 has been disclosed as having only two wheels, it should be understood that legs 16 disposed beneath chopping board assembly 62 can also be equipped with wheels similar to wheels 18. Also, it is not necessary to have wheels attached to the broiler at all. Furthermore, if it is desired to utilize other support means to support the housing of the broiler 10, the legs 16 and shelf 20 can be removed. This feature is especially desirable when it is decided to use the broiler 10 in correlation with an outdoor brick barbecue assembly.

While the charcoal broiler 10 has been shown with cover 50 and wind guards 46 and 48, these elements can be eliminated from the construction so that an open ended grill effect is attained. Of course, this would reduce the cost of the broiler and might be desirable when the broiler is to be utilized in an indoor situation.

The charcoal broiler disclosed herein can be fabricated of various materials; however, a combination of steel, aluminum and wood have been utilized most successfully. The bottom panel 12, end panels 14, rear panel 15 and cover can be made of sheet metal or cast steel. The door handle 25 and cover handle 61 can be made of wood, aluminum or other suitable material, with some attention being given to the fact that these elements should not readily transfer heat.

At this point, it should be obvious that the charcoal broiler described herein is eye-appealing, easily cleaned, and versatile in operation. It will be obvious to those skilled in the art that many variations may be made in the embodiment chosen for the purpose of illustrating the present invention without departing from the scope thereof as defined by the appended claims.

What is claimed as our invention is:
1. Apparatus of the type utilized for cooking food comprising:
   (a) a housing,
   (b) a grill disposed in a horizontal plane within said housing,
   (c) grate means disposed in a horizontal plane beneath said grill within said housing,
   (d) ash receptacle means positioned below said grate means within said housing;
   (e) parallel linkage means connected to said housing and supporting said grate means and said ash receptacle means, for moving said grate means and said ash receptacle means through an arc laterally of and downwardly with respect to said grill.
2. Apparatus of the type utilized for cooking food comprising:
   (a) a housing,
   (b) a grill disposed in a horizontal plane within said housing,
   (c) grate means disposed in a horizontal plane beneath said grill within said housing,
   (d) parallel linkage means connected to said grate means and said housing for moving said grate means laterally of and downwardly with respect to said grill, comprising front grate support means pivotally connected at one of its ends to said housing, rear grate support means pivotally connected at one of its ends to said housing, a connecting arm connected between said front and rear grate support means whereby said connecting arm is maintained in parallel disposition and said rear grate support means is pivotal to positions above and below said connecting arm.
3. The invention of claim 1 wherein said grate means comprises:
   (a) a frame,
   (b) grate elements supported by said frame,
   (c) ash receiving means supported by said frame, disposed below said grate elements, and removable from said frame independently of said grate elements.
4. The invention of claim 1, and further including cover means, link hinge means pivotally connecting said cover means to said housing whereby said cover means is movable to positions over or substantially behind the grill to selectively cover or expose said grill, and means for maintaining said cover means in its position where said grill is exposed.
5. The invention of claim 1 and further including a wind guard connected to said housing and extending upwardly of said grill about three sides thereof, said wind guard being truncated at an angle toward the open side of said grill, and rigid cover means pivotally connected to said wind guard, said cover means being complementary in shape to said wind guard and pivotal to a position to cover said grill.
6. The invention of claim 2 wherein said front and rear grate support means define a series of recesses therein.
7. The invention of claim 1 and further including a door assembly pivotally connected to said housing, said linkage means being connected to said door and actuated by the pivotal movement of said door, said linkage means being constructed and arranged to maintain said door assembly either in an open position or a closed position.
8. Parallel linkage means for supporting a fuel support surface of heating apparatus comprising:
   (a) a housing,
   (b) a first support arm defining a series of recesses along its length and pivotally connected to said housing,
   (c) a second support arm defining a series of recesses along its length and pivotally connected to said housing,

(d) a connecting arm pivotally connected at one of its ends to said first support arm and pivotally connected at its other end to said second support arm, (e) said second support arm and said connecting arm being constructed and arranged so that the recesses of said second support arm are pivotal to positions above and below said connecting arm.

9. The invention of claim 8 wherein said first and second support arms are constructed and arranged so that their recesses may be selectively disposed on either side of their pivot point.

References Cited

UNITED STATES PATENTS

| | | | |
|---|---|---|---|
| 2,265,421 | 12/1941 | Donnelly | 126—41 |
| 2,638,888 | 5/1953 | Molla | 126—154 X |
| 3,016,817 | 1/1962 | Persinger et al. | 126—25 |
| 3,274,987 | 9/1966 | Hastings | 126—25 |
| 3,285,238 | 11/1966 | Norlie | 126—9 |

FREDERICK L. MATTESON, JR., *Primary Examiner.*

E. G. FAVORS, *Assistant Examiner.*